(12) United States Patent
Vargantwar et al.

(10) Patent No.: US 8,126,497 B1
(45) Date of Patent: Feb. 28, 2012

(54) METHOD AND SYSTEM FOR SELECTING TARGET ERROR RATES FOR POWER-CONTROLLING WIRELESS COMMUNICATION LINKS

(75) Inventors: Sachin R. Vargantwar, Overland Park, KS (US); Bhagwan Khanka, Lenexa, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 431 days.

(21) Appl. No.: 12/396,908

(22) Filed: Mar. 3, 2009

(51) Int. Cl.
*H04B 7/00* (2006.01)

(52) U.S. Cl. ............... 455/522; 455/69; 370/318

(58) Field of Classification Search .......... None
See application file for complete search history.

(56) References Cited

U.S. PATENT DOCUMENTS

| | | | |
|---|---|---|---|
| 5,475,861 A | 12/1995 | Hall | |
| 6,148,207 A | 11/2000 | Baum et al. | |
| 6,347,217 B1 | 2/2002 | Bengtsson et al. | |
| 6,671,512 B2 | 12/2003 | Laakso | |
| 6,771,700 B1 | 8/2004 | Razoumov et al. | |
| 6,898,192 B2 | 5/2005 | Chheda et al. | |
| 6,944,449 B1 | 9/2005 | Gandhi et al. | |
| 2005/0053038 A1 * | 3/2005 | Kimura | 370/333 |
| 2005/0288053 A1 | 12/2005 | Gu | |
| 2006/0040697 A1 * | 2/2006 | Komatsu | 455/522 |
| 2007/0173280 A1 * | 7/2007 | Nakayauchi et al. | 455/522 |

OTHER PUBLICATIONS

Vijay K. Garg, "IS-95 CDMA and cdma2000," pp. 181-211, Prentice Hall PTR, 2000.
U.S. Appl. No. 11/619,348, filed Jan. 3, 2007.
U.S. Appl. No. 11/762,534, filed Jun. 13, 2007.
U.S. Appl. No. 12/026,236, filed Feb. 5, 2008.

* cited by examiner

*Primary Examiner* — Anh Tran (57) ABSTRACT

A wireless communication link (a forward link or a reverse link) between a base station and a mobile station may be power-controlled to reduce a difference between an observed error rate in communications received over the link and a target error rate. The target error rate may be dependent upon the radio frequency (RF) conditions at the mobile station, which may be determined by measuring a signal strength of a pilot signal transmitted by the base station. Thus, a pilot signal strength at the mobile station may be determined, a target error rate may be selected based on the pilot signal strength, and the target error rate may be used to control a transmit power level of the wireless communication link. A mobile station may power-control a forward link and/or a base station may power-control a reverse link using a target error rate selected in this way.

20 Claims, 5 Drawing Sheets

METHOD AND SYSTEM FOR SELECTING TARGET ERROR RATES FOR POWER-CONTROLLING WIRELESS COMMUNICATION LINKS

BACKGROUND

Wireless telecommunications networks often use procedures for controlling the transmit power of forward link signals (i.e., signals transmitted from a base station to a mobile station) and/or the transmit power of reverse link signals (i.e., signals transmitted from a mobile station to a base station). For example, code division multiple access (CDMA) networks may use an "inner loop" process and an "outer loop" process for controlling the transmit power of forward link and/or reverse link signals.

In a conventional "inner loop" process, a receiving device receives a wireless signal transmitted by a transmitting device. The receiving device periodically assesses the strength of the received signal, such as by determining the signal-to-noise ratio (SNR), and compares the observed value to a setpoint. If the observed value is lower than the setpoint, the receiving device instructs the transmitting device to increase the transmit power of the wireless signal. If the observed value is higher than the setpoint, the receiving device instructs the transmitting device to lower the transmit power of the wireless signal.

In a conventional "outer loop" process, the receiving device periodically determines a frame error rate (FER) in the received signal and compares the observed FER to a target FER. Conventionally, the target FER is set by the wireless service provider and remains fixed during the power control process. The receiving device may adjust the setpoint used for power control based on the comparison between the observed FER and the target FER. If the observed FER is higher than the target FER, the receiving device may increase the setpoint, which may lead to a corresponding increase in the transmit power level via the "inner loop" process. If the observed FER is lower than the target FER, the receiving device may decrease the setpoint, which may lead to a corresponding decrease in the transmit power level via the "inner loop" process.

Overview

In a first principal aspect, an exemplary embodiment provides a method for power-controlling a wireless communication link between a base station and a mobile station. A signal strength at the mobile station of a pilot signal transmitted by the base station is determined. A target error rate is selected based on the signal strength. The target error rate is used to control a transmit power level of the wireless communication link.

In a second principal aspect, an exemplary embodiment provides a method for power-controlling a forward link transmitted by a base station and received by a mobile station. While operating in a first location, the mobile station measures a first signal strength of a pilot signal transmitted by the base station. The mobile station selects a first target error rate based on the first signal strength. The mobile station uses the first target error rate to power-control the forward link. The mobile station moves from the first location to a second location. While operating in the second location, the mobile station measures a second signal strength of the pilot signal. The mobile station selects a second target error rate based on the second signal strength. The mobile station uses the second target error rate to power-control the forward link.

In a third principal aspect, an exemplary embodiment provides a mobile station comprising a receiver for receiving a pilot channel and a traffic channel transmitted by a base station, a controller, and a transmitter for transmitting power adjustment commands to the base station. The controller is configured to perform the steps of: (a) determining a signal strength of the pilot channel; (b) selecting a target error rate based on the signal strength; (c) determining an observed error rate in communications received over the traffic channel; (d) determining a difference between the observed error rate and the target error rate; and (e) selecting power adjustment commands to decrease the difference, wherein the power adjustment commands adjust a power level at which the base station transmits the traffic channel.

DETAILED DESCRIPTION OF EXEMPLARY EMBODIMENTS

1. Introduction

The inventors have recognized that the conventional approach of using a target FER that remains fixed can lead to inefficiencies. When radio frequency (RF) conditions are good, such as when the mobile station is operating very close to the base station, the target FER may be unnecessarily stringent. This is because when RF conditions are good, signals are unlikely to fade to an unacceptably low level. Thus, a power control process that seeks to achieve this overly-stringent target FER may result in transmit power levels that are unnecessarily high. On the other hand, when RF conditions are poor, such as when the mobile station is operating near the edge of the base station's coverage area, the target FER may be too lenient. A power control process that seeks to achieve this overly-lenient target FER may be unable to compensate for a sudden fade in signal level. As a result, calls may be dropped unnecessarily frequently.

To address such inefficiencies, the inventors propose a target FER that can be adjusted based on RF conditions. For example, when a mobile station is engaged in a communication session via a base station, the signal strength at the mobile station of a pilot signal transmitted by the base station may be determined. A target FER may be selected based on the pilot signal strength, and the target FER that is selected may then be used to control a transmit power level of either the forward link or reverse link. In this way, when the pilot signal strength at the mobile station is relatively high (indicating good RF conditions), the target FER may be set relatively high so as to be less stringent. When the pilot signal strength at the mobile station is relatively low (indicating poor RF conditions), the target FER may be set relatively low so as to be more stringent.

In addition, the target FER may be re-evaluated during a communication session, so that the target FER may be adjusted as the mobile station changes position. For example, if the mobile station moves closer to the base station, the target FER may be increased to allow for a power control process that is less aggressive, thereby taking advantage of the improved RF conditions. If the mobile station moves away from the base station so that the RF conditions worsen, the target FER may be decreased to make the power control process more aggressive.

2. Exemplary Network Architecture

Figure 1:
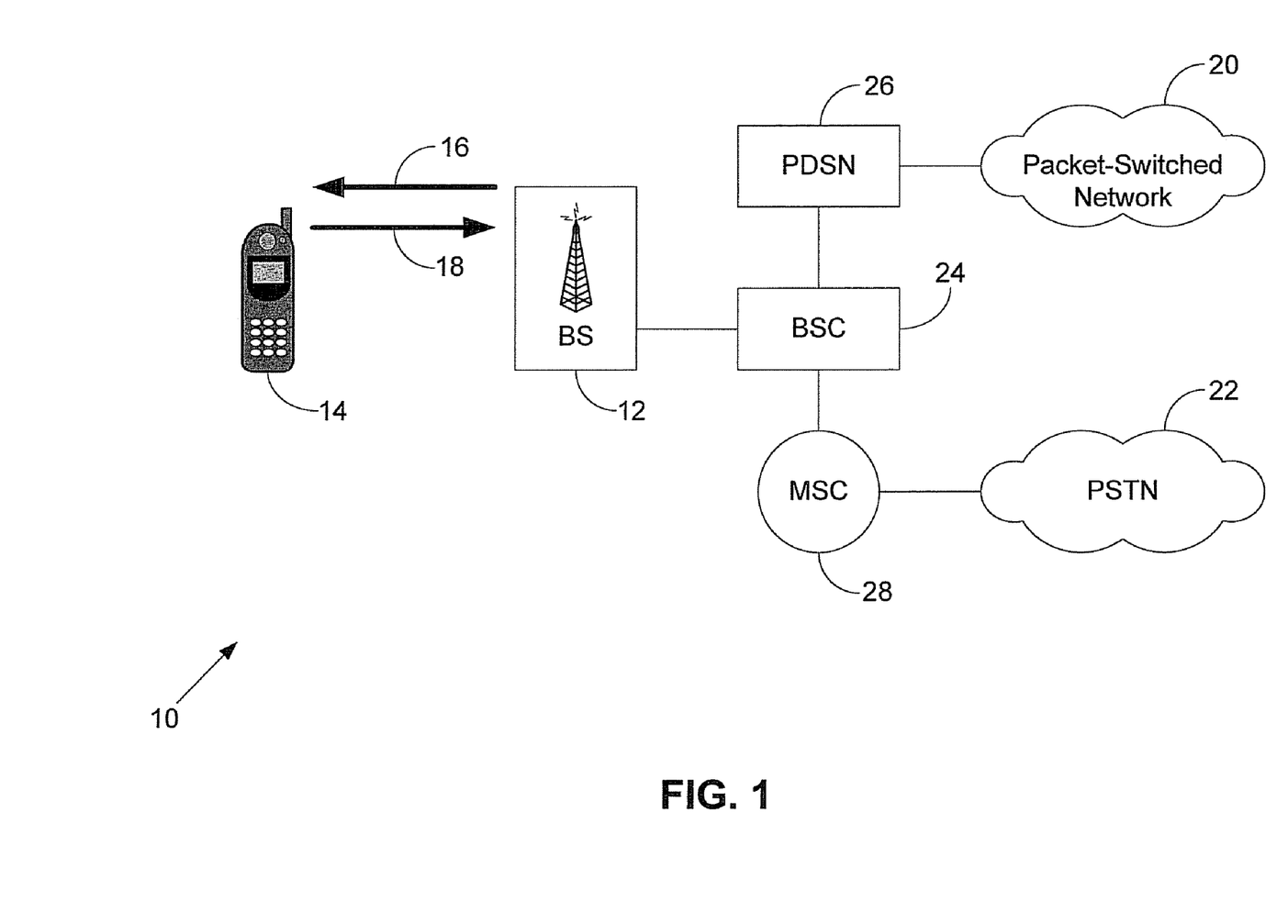
FIG. 1 is a block diagram of a telecommunications network, in accordance with an exemplary embodiment.

FIG. 1 is a simplified block diagram of an exemplary telecommunications network 10, in which exemplary embodiments may be employed. Network 10 includes a base station (BS) 12 that can communicate with mobile stations, such as mobile station 14, via an air interface. Mobile station (MS) 14 could be a wireless telephone, wireless personal digital assistant (PDA), wirelessly equipped laptop computer, or other wireless communication device.

The air interface communications between BS 12 and MS 14 may include a forward link 16 transmitted from BS 12 to MS 14 and a reverse link 18 transmitted from MS 14 to BS 12. The air interface communications may use code division multiple access (CDMA) formats, e.g., in accordance with cdma2000 specifications. However, other air interface formats could be used.

Forward link 16 and reverse link 18 may each include a plurality of channels, including traffic channels and signaling channels. For example, during a communication session, MS 14 may receive communications from BS 12 over a forward traffic channel and may transmit communications over a reverse traffic channel. In addition, MS 14 may monitor a pilot channel transmitted by BS 12.

BS 12 and MS 14 may communicate via forward link 16 and/or reverse link 18 in order to exchange voice, data, video, or other media. In this regard, MS 14 may use BS 12 to communicate with one or more endpoints, e.g., other mobile stations, e-mail servers, Web servers, gaming servers, media servers, or location-based services, via a packet-switched network 20 (e.g., the Internet) and/or a circuit-switched network, such as the public switched telephone network (PSTN) 22. For example, BS 12 may be communicatively coupled to a base station controller (BSC) 24. BSC 24 may, in turn, be communicatively coupled to packet-switched network 20 via a packet data serving node (PDSN) 26. Alternatively or additionally, BSC 24 may be communicatively coupled to PSTN 22 via a mobile switching center (MSC) 28.

Although FIG. 1 shows only one BS, it is to be understood that network 10 may include multiple BSs, which could be communicatively coupled to BSC 24 or to other network elements that are communicatively coupled to packet-switched network 20 and/or PSTN 22. The multiple BSs could, for example, provide wireless coverage in different locations, so that MS 14 may be served by different BSs when operating in different locations. Moreover, the MS 14 may be able to transfer ongoing communication sessions from one BS to another in a handoff process.

As described in more detail below, one or more channels in forward link 16 and one or more channels of reverse link 18 may be power controlled. In particular, MS 14 may use an "inner loop" and an "outer loop" control process to control the power at which BS 12 transmits a signal in forward link 16. Similarly, BS 12 may use an "inner loop" and an "outer loop" control process to control the power at which MS 14 transmits a signal in reverse link 18.

3. Exemplary Methods

Figure 2:
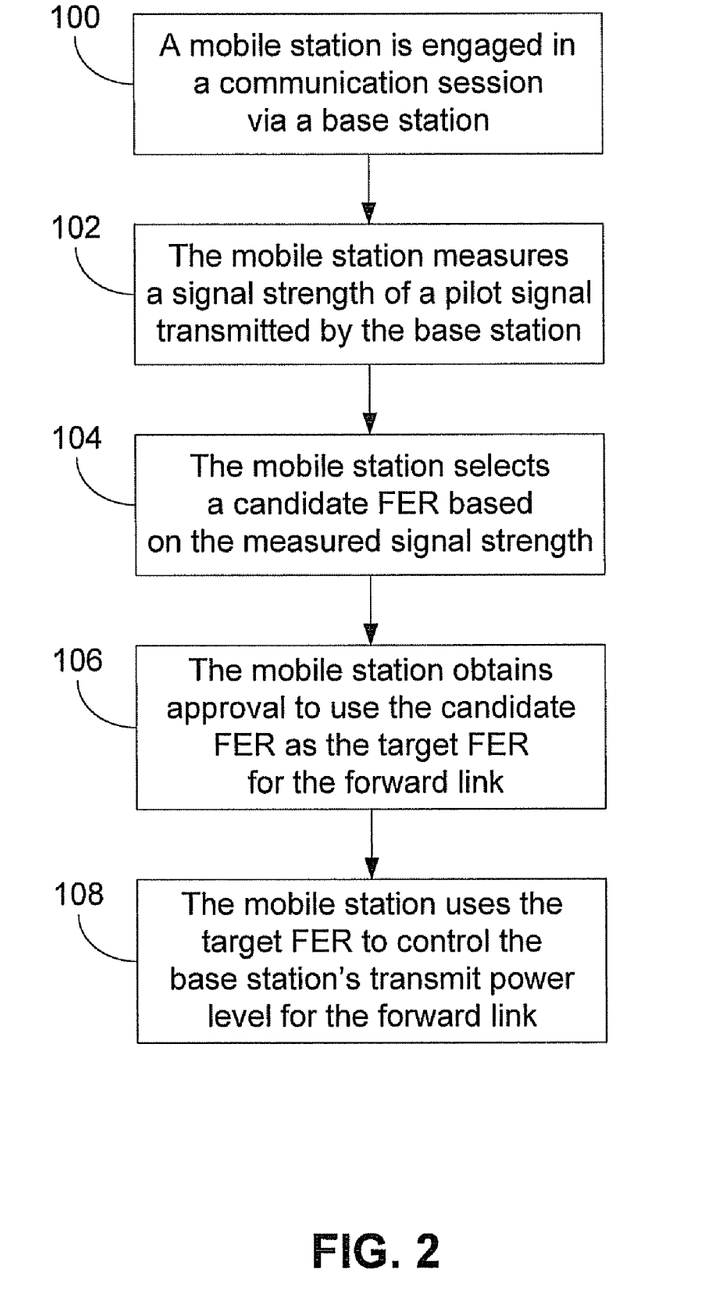
FIG. 2 is a flow chart illustrating a method for selecting and using a target frame error rate (FER) for a forward link, in accordance with an exemplary embodiment.
Figure 3:
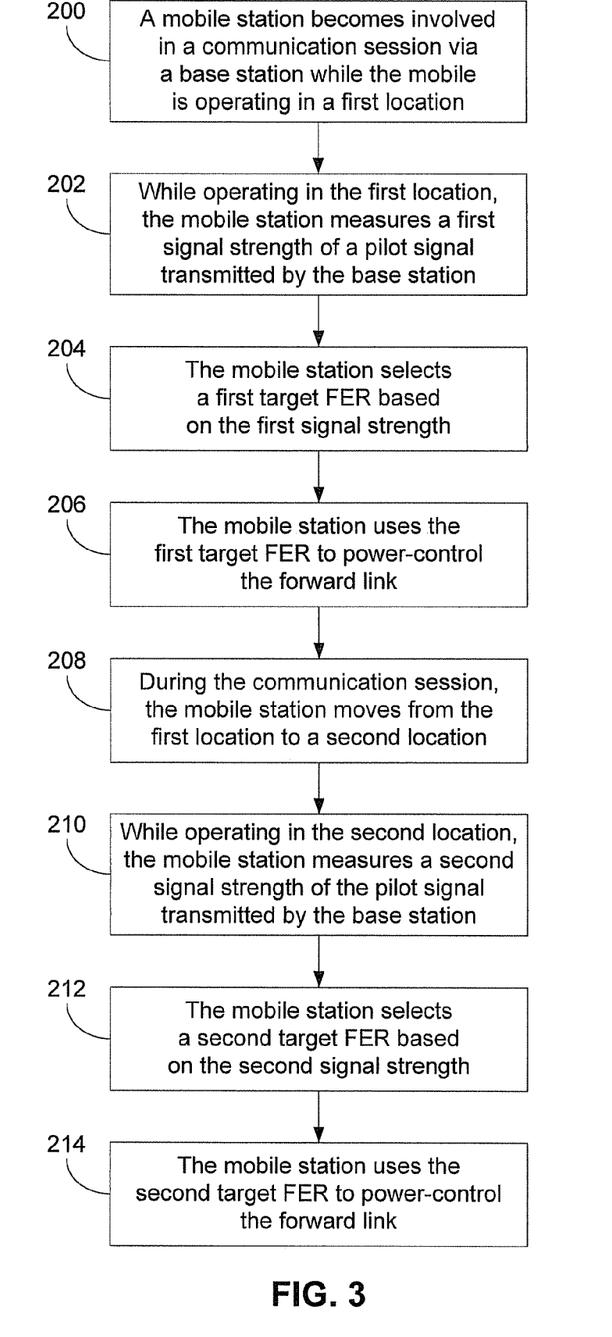
FIG. 3 is a flow chart illustrating a method for selecting and using first and second target FERs for a forward link, in accordance with an exemplary embodiment.
Figure 4:
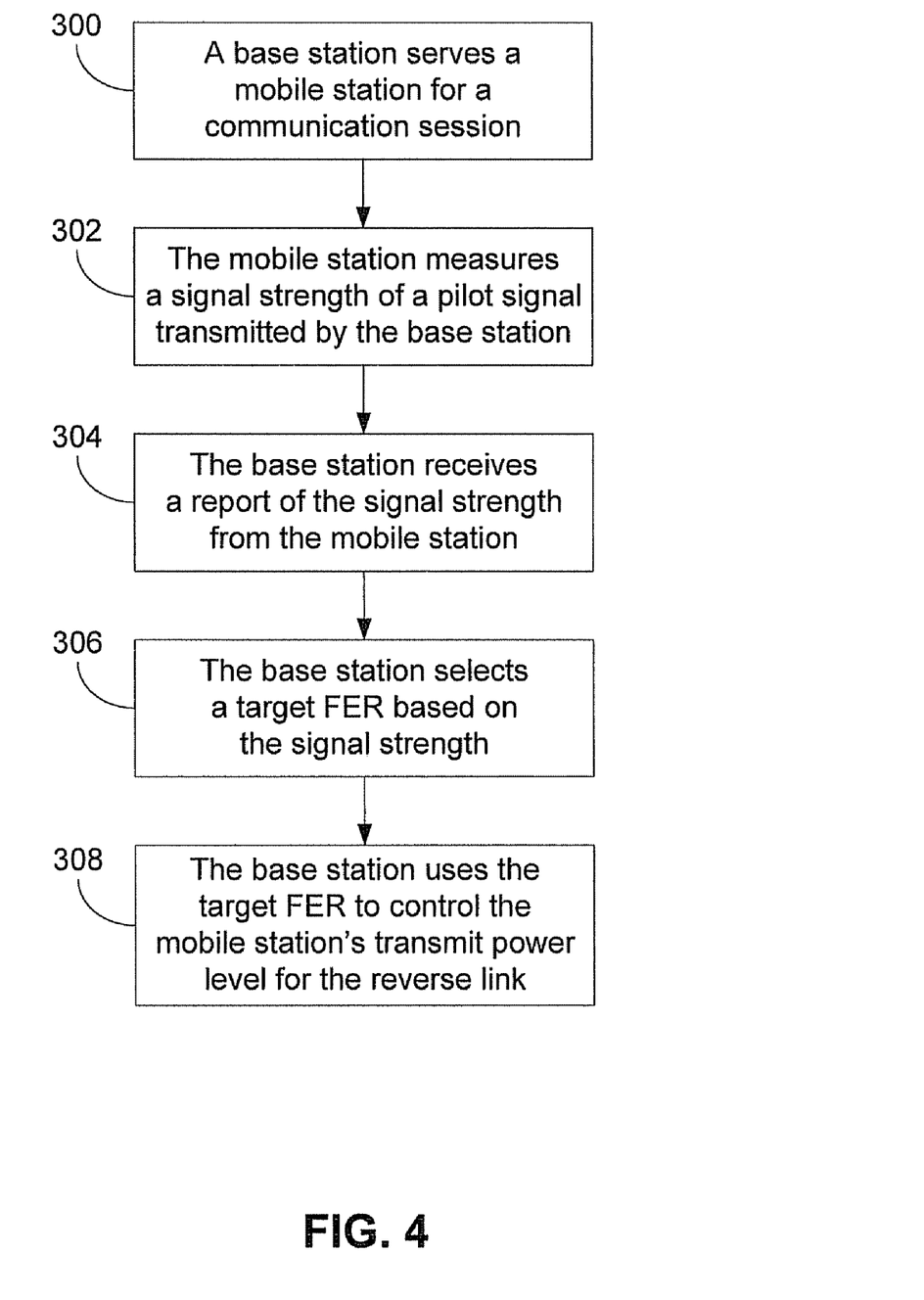
FIG. 4 is a flow chart illustrating a method for selecting and using a target FER for a reverse link, in accordance with an exemplary embodiment.

FIGS. 2-4 are flow chart illustrating exemplary methods. These methods are described with reference to network 10 illustrated in FIG. 1. It is to be understood, however, that other network architectures could be used. In addition, these methods presume that the forward link and/or reverse link is power-controlled based on a target frame error rate (FER). It is to be understood, however, that a wireless communication link (e.g., a forward link or reverse link) could be power-controlled based on other targets. For example, instead of a target FER, a target bit error rate (BER), target packet error rate (PER), or other target error rate could be used.

The method may begin with a mobile station (e.g., mobile station 14) that is engaged in a communication session via a base station (e.g., base station 12), as indicated by block 100. The communication session could be, for example, a voice call or a data session. During the communication session, the mobile station may receive wireless communications from the base station via a forward link (e.g., using a forward traffic channel) and the base station may receive wireless communications from the mobile station via a reverse link (e.g., using a reverse traffic channel).

The mobile station measures a signal strength of a pilot signal transmitted by the base station, as indicated by block 102. The signal strength could be measured, for example, as an $E_C/I_0$ value, wherein $E_C$ is the energy per chip and $I_0$ is the interference power density. It is to be understood, however, that pilot signal strengths could be measured by the mobile station in terms of parameters other than $E_C$ and $I_0$.

The mobile station may then select a candidate FER based on the measured signal strength, as indicated by block 104. The mobile station could make this selection in different ways. For example, the mobile station may be configured to select either a high FER or a low FER as the candidate FER, based on a comparison of the measured signal strength to a threshold value. Thus, if the measured signal strength is above the threshold value, the mobile station may select the high FER. If the measured signal strength is below the threshold value, the mobile station may select the low FER. In exemplary embodiments, the high FER might be 1.5% or 2%, and the low FER might be 0.5% or 1%.

In other embodiments, the mobile station may be configured to select one of three FERs as the candidate FER, wherein each of the three FERs corresponds to a predetermined range of measured signal strengths. For example, the mobile station may select a low FER (e.g., 0.5%) for low-range signal strengths, a medium FER (e.g., 1%) for mid-range signal strengths, and a high FER (e.g., 1.5%) for high-range signal strengths. In still other embodiments, the mobile station may have more than three FERs to select from, with each FER corresponding to a predetermined range of measured signal strengths.

Alternatively, instead of having one or more FERs associated with one or more ranges of measured signal strengths, the mobile station may use other algorithms to select a candidate FER based on the measured signal strength. In addition to the measured signal strength, such algorithms may also take into account other factors for selecting the candidate FER.

Once the mobile station has selected a candidate FER, the mobile station may obtain approval to use the candidate FER as the target FER for the forward link, as indicated by block

106. To obtain approval, the mobile station may send the base station a request to use the candidate FER to use as the target FER. The base station may then determine whether to approve the request and send the mobile station a response either approving or denying the request. In determining whether to approve the request, the base station may evaluate its usage of forward link resources.

For example, a mobile station's request to decrease the target FER for the forward link would indicate that the base station may need to increase the power level of forward link signals transmitted to that mobile station. But the base station may have a limited forward link power allocation, for example, based on a maximum total power that the base station can use to transmit forward link signals to all mobile stations that the base station is serving in a given sector. Thus, to determine whether to approve a mobile station's request to decrease the target FER for the forward link, the base station may determine whether it has sufficient capacity in its forward link power allocation.

Once the candidate FER has been approved, the mobile station uses that candidate FER as the target FER to control the base station's transmit power level for the forward link, as indicated by block 108. The mobile station may use the target FER to power-control the forward link in different ways. For example, the mobile station may determine an observed FER in the communications it receives from the base station over the forward link and compare the observed FER to the target FER. If the observed FER is greater than the target FER, then the mobile station may transmit one or more upward power adjustment commands to the base station to increase the transmit power level. If the observed FER is less than the target FER, then the mobile station may transmit one or more downward power adjustment commands to the base station to decrease the transmit power level.

This power-control process may involve the use of a power-control setpoint, such as a target signal-to-noise ratio (SNR). For example, the mobile station may use an "outer loop" process for adjusting the power-control setpoint based on the difference between the target FER and the observed FER, i.e., increasing the power-control setpoint if the observed FER is greater than the target FER and decreasing the power-control setpoint if the observed FER is less than the target FER. The power-control setpoint may then be used in an "inner loop" process for determining whether the mobile station transmits upward or downward power adjustment commands. For example, when using a target SNR as the power-control setpoint, the mobile station may transmit an upward power adjustment command when the actual SNR measured for the forward link is less than the target SNR and may transmit a downward power adjustment command when the actual SNR measured for the forward is greater than the target SNR. Thus, through these "outer loop" and "inner loop" processes, the mobile station may transmit power adjustment commands to decrease the difference between the observed FER and the target FER.

It is to be understood that the method illustrated in FIG. 2 is exemplary only. For example, in other embodiments the mobile station might not seek approval from the base station to use the candidate FER as the target FER. Instead, the mobile station may simply use the candidate FER as the target FER without communicating the target FER to the base station.

A mobile station may adjust the target FER during a communication session, for example, when the mobile station moves into an area that has different RF conditions (either better or worse) then before. FIG. 3 illustrates an example of this approach. A mobile station becomes involved in a communication session via a base station while the mobile station is operating in a first location, as indicated by block 200. While operating in the first location, the mobile station measures a first signal strength of a pilot signal transmitted by the base station, as indicated by block 202. The mobile station then selects a first target FER based on the first signal strength, as indicated by block 204. And the mobile station uses the first target FER to power-control the forward link during the communication session, as indicated by block 206. For example, the mobile station may transmit power adjustment commands to the base station so as to reduce a difference between the first target FER and an observed FER in communications received over the forward link, as described above.

At some point during the communication session, the mobile station moves from the first location to a second location, as indicated by block 208. While operating in the second location, the mobile station measures a second signal strength of the pilot signal transmitted by the base station, as indicated by block 210. The mobile station then selects a second target FER based on the second signal strength, as indicated by block 212. And the mobile station uses the second target FER to power-control the forward link during the communication session, as indicated by block 214.

It is to be understood that the second target FER could be either higher or lower than the first target FER, depending on whether the second signal strength is greater than or less than the first signal strength. For example, if the mobile station moves closer to the base station during the communication session, then the second signal strength may be greater than the first signal strength. In that case, the second target FER may be higher than the first target FER. On the other hand, if the mobile station moves away from the base station during the communication session, then the second signal strength may be less than the first signal strength. In that case, the second target FER may be lower than the first FER. In this way, the mobile station may adjust the target FER based on changing RF conditions.

The mobile station's measurement of the second signal strength and/or selection of the second target FER may occur in response to one or more triggers. For example, the mobile station may be configured to perform these steps whenever the mobile station detects that it has moved a substantial amount during the communication session. Alternatively, the mobile station may be configured to measure the signal strength of the pilot signal periodically and to adjust the target FER whenever the mobile station measures a signal strength that corresponds to a different target FER. Other triggers could also be used.

FIGS. 2 and 3 illustrate methods in which a mobile station selects a target FER for the forward link. However, a base station may use a similar approach to select a target FER for the reverse link. FIG. 4 illustrates an exemplary method. A base station serves a mobile station for a communication session, as indicated by block 300. In this communication session, the base station may transmit voice, data, or other media to the mobile station over a forward link (e.g., a forward traffic channel), and the mobile station may transmit voice, data, or other media to the base station over a reverse link (e.g., using a reverse traffic channel).

During the communication session, the mobile station measures a signal strength of a pilot signal transmitted by the base station, as indicated by block 302. The base station receives a report of the signal strength from the mobile station, as indicated by block 304. For example, the mobile station may transmit a Pilot Strength Measurement Message (PSMM) to the base station. The base station then selects a target FER based on the signal strength, as indicated by block 306. The base station uses the target FER to control the mobile station's transmit power level for the reverse link (e.g., the power level at which the mobile station transmits a reverse traffic channel), as indicated by block 308. For example, the base station may transmit power adjustment commands to the mobile station so as to reduce a difference between the target FER and the observed FER in communications received over the reverse link.

4. Exemplary Mobile Station

Figure 5:
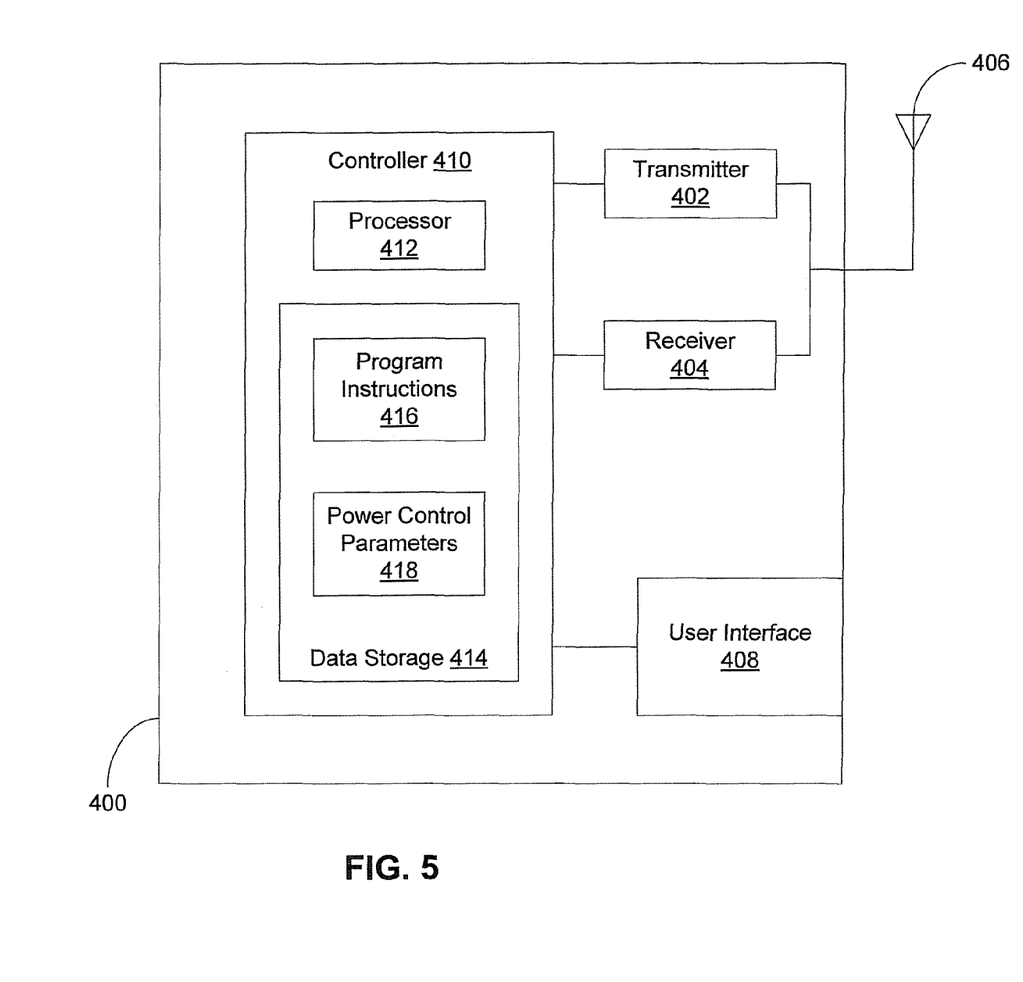
FIG. 5 is a block diagram of a mobile station, in accordance with an exemplary embodiment.

FIG. 5 illustrates an exemplary mobile station 400 that can operate in accordance with the methods illustrated in FIGS. 2 and 3. Mobile Station 400 includes a transmitter 402 for transmitting reverse link signals and a receiver 404 for receiving forward link signals. The reverse link signals transmitted by transmitter 402 may include communications transmitted over a reverse traffic channel and received by a base station (e.g., base station 12 in FIG. 1) during a communication session. The forward link signals received by receiver 404 may include communications transmitted by a base station (e.g., base station 12 in FIG. 1) in a forward traffic channel during a communication session. In addition, receiver 404 may receive a pilot channel transmitted by the base station. Transmitter 402 and receiver 404 may be coupled to one or more antennas, such as antenna 406. Transmitter 402 and 404 could be integrated together as a transceiver.

Mobile station 400 also includes a user interface 408 for obtaining input from a user of mobile station 400 and for conveying information to user. Thus, user interface 408 may include a keypad, touch screen, or other controls by which the user may provide input into mobile station 400. User interface 408 may also include a display for displaying textual, graphical, or other visual information to the user. Mobile station 400 may also be configured for voice communication. Thus, user interface 408 may include a microphone for receiving audio input from the user and a speaker for conveying audio to the user. Alternatively, mobile station 400 may communicate with an external microphone and/or speaker, for example, via a wireless connection.

The functioning of mobile station 400 may be controlled by a controller 410, which may be coupled to transmitter 402, receiver 404, and user interface 406. Controller 410 may comprise a processor 412 and data storage 414. Data storage 414 may include volatile and/or non-volatile memory. Data storage 414 may store program instructions 416 that are executable by processor 412 to control the functioning of mobile station 400. Data storage 414 may also store other information. For example, data storage 414 may store power control parameters 418. Power control parameters 418 may include the target FER that mobile station 400 is currently using to power-control the forward link. Power control parameters 418 may also include a table that determines which target FERs are selected for which pilot signal strengths. Power control parameters 418 may also include other information used by mobile station 400 to power-control the forward link.

Program instructions 416 may be executable by processor 412 so as to cause mobile station 400 to select and to use a target FER, for example, as illustrated in FIG. 2 and described above. Thus, program instructions 416 may be executable to perform the steps of: (a) determining a signal strength of the pilot channel transmitted by the base station, as received by receiver 404; (b) selecting a target FER based on the signal strength (either independently or upon approval from the base station); (c) determining an observed FER in communications received over the traffic channel; (d) determining a difference between the observed FER and the target FER; and (e) selecting power adjustment commands to decrease the difference, wherein the power adjustment commands adjust a power level at which the base station transmits the traffic channel. Transmitter 402 may then transmit the power adjustment commands to the base station.

Program instructions 416 may cause steps (a) and (b) to be performed periodically or in response to a trigger condition, such as detecting that mobile station 400 has moved by a certain amount. Steps (c), (d), and (e) may be performed periodically as part of an "outer loop" and "inner loop" power control process. In this way, mobile station 400 may be configured to adjust the target FER it uses to power-control the forward link transmitted by a base station based on the RF conditions, as determined by the strength of the base station's pilot signal.

It is to be understood that the above description of mobile station 400 is exemplary only. For example, instead of determining an observed frame error rate and using a target error rate, other error rates could be used (e.g., bit error rate or packet error rate). In addition, controller 410 has been described based on program instructions 416 stored in data storage 414, controller 410 could be implemented using hardware, software, and/or firmware.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for power-controlling a wireless communication link between a base station and a mobile station, said method comprising:
   determining a signal strength at said mobile station of a pilot signal transmitted by said base station;
   selecting a target error rate based on said signal strength, wherein selecting said target error rate based on said signal strength comprises (i) if said signal strength is above a threshold value, selecting a first error rate as said target error rate, and (ii) if said signal strength is below said threshold value, selecting a second error rate as said target error rate; and
   using said target error rate to control a transmit power level of said wireless communication link.

2. The method of claim 1, wherein said wireless communication link is a forward link.

3. The method of claim 2, wherein determining a signal strength at said mobile station of a pilot signal transmitted by said base station comprises:
   said mobile station measuring said signal strength of said pilot signal.

4. The method of claim 3, wherein using said target error rate to control a transmit power level of said wireless communication link comprises:
   said mobile station using said target error rate to control a power level at which said base station transmits a forward traffic channel.

5. The method of claim 2, wherein selecting a target error rate based on said signal strength comprises:
   said mobile station selecting a candidate error rate based on said signal strength;
   said mobile station sending to said base station a request to use said candidate error rate as said target error rate; and said mobile station receiving from said base station an approval to use said candidate error rate as said target error rate.

6. The method of claim 1, wherein said wireless communication link is a reverse link.

7. The method of claim 6, wherein determining a signal strength at said mobile station of a pilot signal transmitted by said base station comprises:
said base station receiving a report of said signal strength from said mobile station.

8. The method of claim 7, wherein using said target error rate to control a transmit power level of said wireless communication link comprises:
said base station using said target error rate to control a power level at which said mobile station transmits a reverse traffic channel.

9. The method of claim 1, wherein said signal strength is an $E_c/I_0$ value.

10. The method of claim 1, wherein said target error rate is a target frame error rate (FER).

11. The method of claim 1, wherein said first error rate is higher than said second error rate.

12. The method of claim 1, wherein using said target error rate to control a transmit power level of said wireless communication link comprises:
determining an observed error rate in communications received over said wireless communication link;
comparing said observed error rate to said target error rate; and
adjusting a power-control setpoint based on a difference between said observed error rate and said target error rate.

13. The method of claim 12, wherein adjusting a power-control setpoint based on a difference between said observed error rate and said target error rate comprises:
if said observed error rate is greater than said target error rate, increasing said power-control setpoint; and
if said observed error rate is less than said target error rate, decreasing said power-control setpoint.

14. A mobile station, comprising:
a receiver for receiving a pilot channel and a traffic channel transmitted by a base station;
a controller configured to perform functions comprising:
(a) determining a signal strength of said pilot channel;
(b) selecting a candidate error rate based on said signal strength;
(c) obtaining approval from said base station to use said candidate error rate as a target error rate;
(d) determining an observed error rate in communications received over said traffic channel;
(e) determining a difference between said observed error rate and said target error rate; and
(f) selecting power adjustment commands to decrease said difference, wherein said power adjustment commands adjust a power level at which said base station transmits said traffic channel; and
a transmitter for transmitting said power adjustment commands to said base station.

15. The mobile station of claim 14, wherein said controller is configured to perform steps (a) and (b) at periodic time intervals.

16. The mobile station of claim 14, wherein obtaining approval from said base station to use said candidate error rate as a target error rate comprises sending said base station a request to use said candidate error rate as said target error rate.

17. The mobile station of claim 14, wherein selecting a candidate error rate based on said signal strength comprises (i) if said signal strength is above a threshold value, selecting a first error rate as said candidate error rate, and (ii) if said signal strength is below said threshold value, selecting a second error rate as said candidate error rate.

18. A method for power-controlling a forward link transmitted by a base station and received by a mobile station, said method comprising:
said mobile station measuring a signal strength of a pilot signal transmitted by said base station;
said mobile station selecting a candidate error rate based on said signal strength;
said mobile station sending to said base station a request to use said candidate error rate as a target error rate;
said mobile station receiving from said base station an approval to use said candidate error rate as said target error rate; and
said mobile station using said target error rate to control a transmit power level of said forward link.

19. The method of claim 18, wherein said mobile station selecting a candidate error rate based on said signal strength comprises said mobile station comparing said signal strength to a threshold value.

20. The method of claim 19, wherein said mobile station selecting a candidate error rate based on said signal strength further comprises (i) if said signal strength is above said threshold value, said mobile station selecting a first error rate as said candidate error rate, and (ii) if said signal strength is below said threshold value, said mobile station selecting a second error rate as said candidate error rate.

* * * * *